Jan. 26, 1965   J. F. HELMS   3,167,365
CAGE FOR ROLLING BEARINGS
Filed April 26, 1963
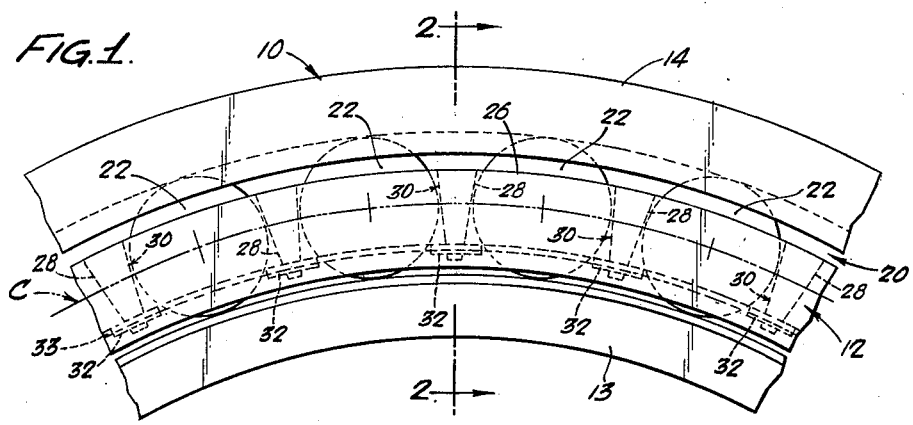
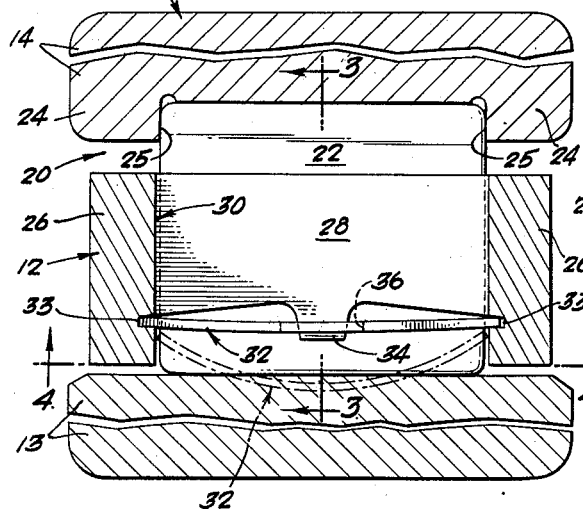
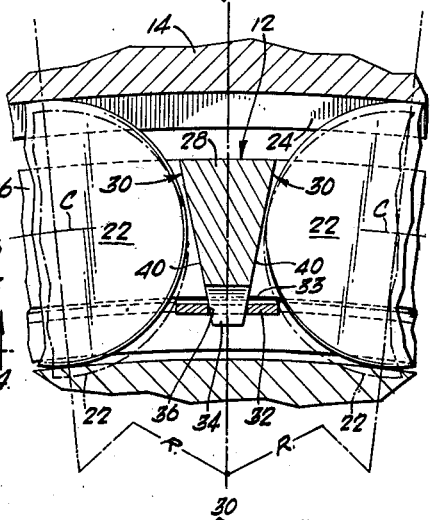
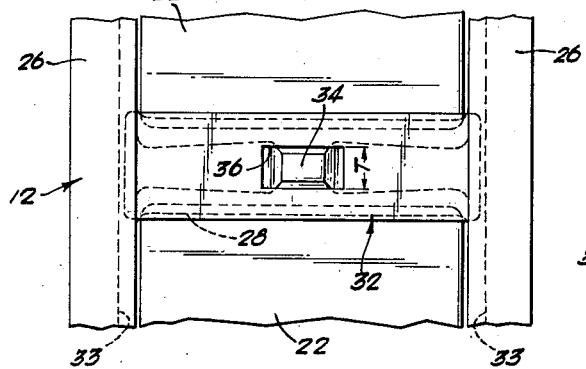
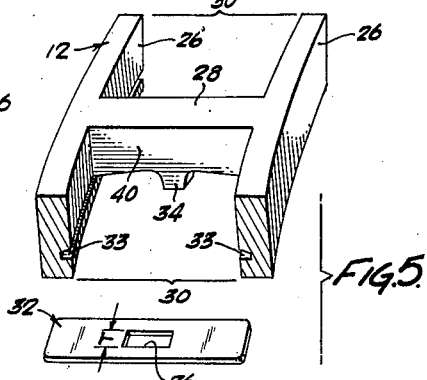
Inventor:
John F. Helms
by Howson & Howson Attys.

United States Patent Office 3,167,365
Patented Jan. 26, 1965

3,167,365
CAGE FOR ROLLING BEARINGS
John F. Helms, Warminster, Pa., assignor to SKF Industries, Inc., Philadelphia, Pa., a corporation of Delaware
Filed Apr. 26, 1963, Ser. No. 275,864
18 Claims. (Cl. 308—217)

This invention relates to a new and improved cage for rolling bearings adapted to guide the rolling elements in the rolling bearing assembly.

The case of the present invention is illustrated in connection with a cylindrical roller bearing assembly having cylindrical roller elements. Some cages for roller bearings comprise a pair of annular rings and a plurality of cross pieces which connects the rings in spaced apart relation and which are circumferentially spaced apart to define pockets for the roller elements. Each of the cross pieces is provided with a pair of circumferentially directed projections or lugs approximately centrally thereof which extend into the pockets a predetermined amount so that the distance between confronting projections is slightly less than the diameter of one of the roller elements, thereby to limit radial displacement of the roller in one direction. In assembling a bearing employing this type of cage, the cage is disposed interiorly of the outer race ring and the roller elements are then inserted into the pockets. The cross pieces then are deformed, for example, by peening to form the lugs to limit radial inward displacement of the roller elements.

This prior type of cage construction has several disadvantages. For example, the assembly operation is tedious and time consuming. Moreover, it has been found that the cross pieces are weakened somewhat as a result of deformation to form the projections or lugs resulting in premature failure of the lugs during operation of the bearing. Additionally, the lugs are usually spaced close to the pitch circle of the set of rollers so that they may be made as small as possible and confronting lugs are spaced apart slightly less than the diameter of the roller elements to facilitate removal of the rollers past the lugs, for example, for replacement purposes. However, due to the method of forming the lugs and by reason of the close disposition thereof to the pitch circle, it is difficult to provide a clearance between the lugs and roller elements which is sufficiently small and uniform to afford accurate control of roller drop such that assembly with the bearing inner ring is facilitated. Moreover, with the lugs disposed centrally of the roller elements, the rollers are not supported in a manner to prevent cocking or skewing which adds to the difficulty in assembling elements of the bearing assembly.

In accordance with the present invention, there is provided a cage for rolling bearings which is of comparatively simplified construction so that it may be manufactured easily and economically and which has novel features of construction and arrangement whereby the bearing may be assembled easily and quickly to provide an accurate support for the roller elements in a manner whereby roller drop may be controlled effectively. Moreover, the cage is designed so that it forms with the roller elements and one of the rings an integral unit. To this end, the cage of the present invention comprises a pair of annular members, a plurality of webs connecting the annular members in spaced apart relation which are circumferentially spaced apart to provide pockets for the roller elements and a clip member detachably secured between the annular members adjacent each of the webs. The clips are detachably secured between the annular rings of the cage and in the assembled cage are firmly located in a predetermined position by engagement of a centrally located tang depending from the webs, which cooperatively engages with each of the clips. This arrangement provides a rugged, rigid cage construction and one which is easy to assemble with the roller elements and the race rings. Moreover, the detachably mounted clips can be more precisely and uniformly spaced from the roller elements and are disposed remote from the pitch circle of the set of rollers thereby providing a more aaccurate control of roller drop. Further, the clips extend the entire axial width of the pocket to provide an accurate support for the roller elements thereby minimizing cocking and skewing.

In the cage illustrated, the side faces of each of the webs converge radially toward the clips and, if desired, the distance between confronting faces of adjacent webs remote from the clips may be made less than the roller diameter to limit radial movement of the rollers in one direction; the distance between confronting side edges of adjacent clips being spaced apart less than the roller diameter to limit radial displacement of the rollers in the pockets in the opposite radial direction. By this arrangement, the rollers and cage form an integral unit.

With the foregoing in mind, an object of the present invention is to provide a new and improved cage for a rolling bearing assembly which is of comparatively simplified construction, is characterized by relatively few parts and is extremely economical to manufacture.

Another object of the present invention is to provide a new and improved cage having novel features of construction and arrangement facilitating easy and quick assembly of a rolling bearing.

Still another object of the present invention is to provide a cage for a rolling bearing assembly constructed so that the cage, rolling elements and one of the race rings form an integral unit.

A further object of the present invention is to provide a cage for rolling bearings having novel features of construction and arrangement providing an extremely accurate control of rolling element drop in the bearing assembly and providing an accurate support for the rolling elements.

These and other objects of the present invention and the various features and details of the operation and construction of a cage in accordance with the present invention are hereinafter more fully set forth with reference to the drawings, wherein:

FIG. 1 is a fragmentary side elevational view of a roller bearing assembly including a cage constructed in accordance with the present invention;

FIG. 2 is an enlarged sectional view taken on line 2—2 of FIG. 1;

FIGS. 3 and 4 are fragmentary sectional views taken on lines 3—3 and 4—4 of FIG. 2, respectively; and FIG. 5 is a fragmentary perspective view of a portion of the cage of the present invention.

Referring now to the drawing, there is illustrated in FIG. 1 a portion of a rolling bearing assembly 10 including a cage 12 constructed in accordance with the present invention. As illustrated, the rolling bearing assembly 10 comprises inner and outer race rings 13 and 14 respectively, spaced apart to define an annular space 20 therebetween for the rolling elements 22. In the present instance the bearing assembly illustrated is a cylindrical roller bearing having cylindrical roller elements. In the present instance, the outer race ring 14 has a pair of radially inwardly projecting, circumferentially extending flanges 24 adjacent opposite axial ends thereof providing abutment shoulders 25 limiting axial movement of the roller elements 22. The cage 12 includes a pair of annular members or rings 26 and a plurality of axial web or cross piece elements 28 which in the present instance, are formed integrally with the annular members 26 and which are circumferentially spaced apart to define pockets 30 for the roller elements 22.

In accordance with the present invention, the cage 12 is characterized by novel features of construction and arrangement facilitating easy and quick assembly of the elements of the roller bearing. To this end the cage 12 includes a plurality of clip elements 32 each of which is detachably secured between the annular members 26 and extends axially of the cage adjacent one of the web members 28. The clip elements 32 are preferably made of a comparatively thin, flexible sheet material, such as steel and as illustrated, for example, in FIG. 5, each of the clip elements 32 is of generally rectangular configuration and of a length greater than the distance between the inner confronting faces of the annular members 26, so that it may be sprung into place between the annular members 26 with the opposite ends thereof engaging in confronting, circumferentially extending grooves 33 in the annular members as illustrated in FIG. 2. The clips are retained at predetermined circumferentially spaced locations to one radial side of the web elements 28 by interengaging means on the pairs of clips and cross pieces including, in the present instance, a radially inwardly depending tang 34 on each of the web elements 28 which engages in a rectangular opening 36 in the clip 32. It is noted that the transverse dimension T of the opening 36 is selectively chosen so that the tang 34 frictionally engages the side edges of the opening 36 to minimize lateral movement of the clip elements 32 in the assembled cage.

Accordingly, in assembling a bearing employing a cage construction in accordance with the present invention, the cage without the clips 32 assembled thereto is disposed interiorly of the outer race ring 14. Thereafter, the roller elements 22 are positioned in the pockets 30 from the interior of the cage. A clip 32 is then sprung into place adjacent the web elements 28 on either side of the first roller element positioned in the cage 12 whereby the roller element 22 is retained in the pocket 30 against radial movement in both directions. The remaining roller elements 22 are then inserted into their respective pockets to either side of the first assembled roller element 22 and a clip is added upon assembly of each of the remaining roller elements. By this arrangement, the outer race ring 14, cage 12 and roller elements 22 form an integral unit which may then be assembled to the inner race ring 13.

It is noted that in bearing assemblies where neither of the race rings has radially projecting flanges, the roller elements may be assembled to the cage and form therewith an integral unit which may then be assembled to the inner and outer race rings. To this end the web elements 28, which are of wedge-shaped cross section having in the present instance radially inwardly converging tapered side faces 40, may be formed so that the smallest distance between confronting faces 40 to the side of the pitch circle opposite the clips is slightly less than the diameter of the roller elements 22 to limit outward radial displacement of the roller elements, the clips 32 limiting inward radial displacement of the roller elements.

As illustrated for example in FIGS. 2 and 3, the clip elements 32 are positioned remote from the pitch circle C of the set of rollers and the side edges of the clip elements 32 are spaced a small distance from the periphery of the roller elements 22. By this arrangement inward radial displacement of the roller elements 22 is maintained at a minimum thereby facilitating assembly of the roller elements 22 and cage 12 to the race rings. Further, the clip elements 32 extend the entire axial length of the pockets 30 to provide an accurate support for the roller elements thereby minimizing cocking or skewing thereof.

From the foregoing, it may be seen that the present invention provides an improved cage for roller bearings which is characterized by novel features of construction and arrangement facilitating easy and quick assembly of the various elements of the bearing assembly. Moreover, the manner in which the clip elements are retained in the cage in a position remote from the pitch circle of the set of rollers, provides for a uniform minimum clearance between the clip elements and the roller elements thereby minimizing roller drop. Additionally, the axial extent for the entire length of the pocket of the clip elements assures an accurate support for the roller elements preventing cocking or skewing thereof.

Even though the cage of the present invention is illustrated in connection with a single row, cylindrical roller bearing, it is to be understood that it may be used with other types of bearing assemblies.

While particular embodiments of the present invention have been illustrated and described herein, it is to be understood that changes and modifications may be made therein within the scope of the following claims.

I claim:

1. A cage for the rolling elements of a rolling bearing, comprising a pair of annular members, a plurality of axial cross pieces connecting the annular members which are spaced apart circumferentially to define pockets for the rolling elements, a clip element between the annular members in a predetermined position radially to one side of each of said cross pieces, means detachably securing said clip elements between the annular members, means defining an opening in each of said clip elements, a tang projecting radially from each of said cross pieces engageable in said opening in the clip element to locate each of said clip elements in a predetermined position, adjacent clip elements being circumferentially spaced apart to provide a space therebetween which is less than the maximum diameter of one of the rolling elements to limit displacement of the rolling elements in one radial direction.

2. A cage as claimed in claim 1, wherein each of the cross pieces has radially extending side faces which converge toward the clip and wherein confronting side faces of said cross pieces remote from said pitch circle to the side thereof opposite said one side are spaced apart a distance less than the maximum diameter of one of the rollers to limit displacement of the rollers in the radial direction opposite said one radial direction.

3. A cage as claimed in claim 1 wherein the cross section of said tang is generally rectangular and the opening in each of said clip elements is also rectangular to accommodate said tang.

4. A cage as claimed in claim 1 including means defining circumferentially extending confronting grooves in the confronting side faces of the annular members within which the outer ends of said clip elements are engaged.

5. A cage as claimed in claim 1, wherein said cross piece elements are disposed radially inwardly of the pitch circle of the set of rolling elements.

6. A cage for the rolling elements of a rolling bearing, comprising a pair of annular members, a plurality of cross piece elements connecting the annular members which are spaced apart circumferentially to define pockets for the rolling elements, a plurality of clip elements, means detachably connecting the clip elements between the annular members in a predetermined position at one side of the pitch circle of the set of rolling elements, a clip element disposed adjacent each of the cross piece elements and aligned generally axially therewith, interengaging means connecting the clip and cross piece elements of each pair of clip and cross piece elements to locate the clip elements in said predetermined position, adjacent clip elements being circumferentially spaced apart to provide a space therebetween which is less than the maximum diameter of one of the rolling elements to limit displacement of the rolling elements in one radial direction.

7. A cage as claimed in claim 6 wherein said clip elements are disposed radially inwardly of the pitch circle of the set of rolling elements.

8. A cage as claimed in claim 6 including means defining a circumferentially extending groove in the confronting faces of each of the annular members within which the outer ends of the clip elements are engaged.

9. A cage as claimed in claim 6 wherein each of said cross piece elements has radially extending side faces which converge toward the clip elements whereby confronting side faces of said cross piece elements remote from said pitch circle to the side thereof opposite said one side are spaced apart a distance less than the maximum diameter of one of the rolling elements to limit displacement of the rolling elements in the radial direction opposite said one radial direction.

10. A cage for the rolling elements of a rolling bearing, comprising a pair of annular members, a plurality of cross piece elements connecting the annular members which are spaced apart circumferentially to define pockets for the rolling elements, a plurality of clip elements, means detachably connecting the clip elements between the annular members in a predetermined position at one side of the pitch circle of the set of rolling elements, a clip element being disposed adjacent each of the cross piece elements and aligned axially therewith, means defining an opening in one element of each pair of clip elements and cross pieces, a tang on the other element of each of said pairs engageable in said opening to locate said clip elements in said predetermined position relative to said cross pieces, adjacent clip elements being circumferentially spaced apart to provide a space therebetween which is less than the maximum diameter of one of the rolling elements to limit displacement of the rolling elements in one radial direction.

11. A cage as claimed in claim 10 wherein said clip elements are disposed radially inwardly of the pitch circle of the set of rolling elements.

12. A cage as claimed in claim 10 including means defining a circumferentially extending groove in the confronting faces of each of the annular members within which the outer ends of the clip elements are engaged.

13. A cage as claimed in claim 10 wherein each of said cross piece elements has radially extending side faces which converge toward the clip elements whereby confronting side faces of said cross piece elements remote from said pitch circle to the side thereof opposite said one side are spaced apart a distance less than the maximum diameter of one of the rolling elements to limit displacement of the rolling elements in the radial direction opposite said one radial direction.

14. In bearing assembly comprising inner and outer rings spaced apart to define an annular space therebetween, a plurality of rolling elements in the annular space between the rings, the improvement of a cage for guiding the rolling elements in the annular space comprising a pair of annular members in the annular space, a plurality of cross piece elements connecting the annular members which are spaced apart circumferentially to define pockets for the rolling elements, a plurality of clip elements, means detachably connecting the clip elements between the annular members at one side of the pitch circle of the set of rolling elements, a clip element being disposed adjacent each of said cross pieces and aligned axially therewith, interengaging means connecting the clip element and cross piece element of each of said pairs of clip elements and cross piece elements to locate said clip elements in predetermined position relative to said cross piece elements, adjacent clip elements being circumferentially spaced apart to provide a space therebetween which is less than the maximum diameter of one of the rolling elements to limit displacement of the rolling elements in one direction.

15. A bearing assembly as claimed in claim 14 wherein said clip elements are disposed radially inwardly of the pitch circle of the set of rolling elements.

16. A bearing assembly as claimed in claim 14 including means defining a circumferentially extending groove in the confronting faces of each of the annular members within which the outer ends of the clip elements are engaged.

17. A bearing assembly as claimed in claim 14 wherein each of said cross piece elements has radially extending side faces which converge toward the clip elements whereby confronting side faces of said cross piece elements remote from said pitch circle to the side thereof opposite said one side are spaced apart a distance less than the maximum diameter of one of the rolling elements to limit displacement of the rolling elements in the radial direction opposite said one radial direction.

18. A bearing assembly as claimed in claim 14 wherein the interengaging means comprises an opening in each of the clip elements and a tang projecting from each of the cross piece elements engageable in the opening in the clip.

References Cited by the Examiner
UNITED STATES PATENTS

| | | | |
|---|---|---|---|
| 1,887,176 | 11/32 | Young | 308—217 |
| 1,940,124 | 12/33 | Gibbons | 308—217 |
| 2,457,485 | 12/48 | Newton | 308—217 |
| 3,050,353 | 8/62 | Bratt | 308—217 |
| 3,087,762 | 4/63 | Gothberg | 308—217 |

ROBERT C. RIORDON, *Primary Examiner.*